(12) United States Patent
Lubbers et al.

(10) Patent No.: US 8,131,926 B2
(45) Date of Patent: Mar. 6, 2012

(54) GENERIC STORAGE CONTAINER FOR ALLOCATING MULTIPLE DATA FORMATS

(75) Inventors: Clark Edward Lubbers, Colorado Springs, CO (US); Randy L. Roberson, New Port Richey, FL (US); Diana Shen, Colorado Springs, CO (US)

(73) Assignee: Seagate Technology, LLC, Cupertino, CA (US)

( * ) Notice: Subject to any disclaimer, the term of this patent is extended or adjusted under 35 U.S.C. 154(b) by 483 days.

(21) Appl. No.: 10/969,147

(22) Filed: Oct. 20, 2004

(65) Prior Publication Data
US 2006/0085593 A1  Apr. 20, 2006

(51) Int. Cl.
*G06F 12/00* (2006.01)

(52) U.S. Cl. ........ 711/114; 711/117; 711/165; 711/170; 711/E12.002; 711/E12.005; 711/E12.006; 711/E12.013

(58) Field of Classification Search .................. 711/114, 711/117, 165, 170, E12.002, E12.005, E12.006, 711/E12.013
See application file for complete search history.

(56) References Cited

U.S. PATENT DOCUMENTS

| | | |
|---|---|---|
| 4,847,807 A | 7/1989 | Yule |
| 5,285,451 A | 2/1994 | Henson et al. |
| 5,325,363 A | 6/1994 | Lui |
| 5,412,661 A | 5/1995 | Hao et al. |
| 5,519,844 A | 5/1996 | Stallmo |
| 5,537,567 A | 7/1996 | Galbraith et al. |
| 5,544,339 A | 8/1996 | Baba |
| 5,568,629 A | 10/1996 | Gentry et al. |
| 5,632,027 A | 5/1997 | Martin et al. |
| 5,671,349 A | 9/1997 | Hashemi et al. |
| 5,671,390 A | 9/1997 | Brady et al. |
| 5,682,509 A | 10/1997 | Kabenjian |
| 5,708,769 A | 1/1998 | Stallmo |
| 5,729,763 A | 3/1998 | Leshem |
| 5,790,774 A | 8/1998 | Sarkozy |
| 5,805,788 A | 9/1998 | Johnson |
| 5,812,754 A | 9/1998 | Lui et al. |
| 5,822,782 A | 10/1998 | Humlicek et al. |
| 5,832,198 A | 11/1998 | Lucht |
| 5,845,319 A | 12/1998 | Yorimitsu |
| 5,889,934 A | 3/1999 | Peterson |
| 5,893,919 A | 4/1999 | Sarkozy et al. |
| 5,933,834 A | 8/1999 | Aichelen |
| 5,960,169 A | 9/1999 | Styczinski |
| 6,016,552 A | 1/2000 | Lee et al. |
| 6,041,407 A | 3/2000 | Claar et al. |
| 6,052,759 A | 4/2000 | Stallmo et al. |

(Continued)

FOREIGN PATENT DOCUMENTS

EP       1168176 A2   1/2002

(Continued)

*Primary Examiner* — Midys Rojas
(74) *Attorney, Agent, or Firm* — Mitchell K. McCarthy

(57) ABSTRACT

A generic storage container system is provided for a grid-based storage architecture, comprising a generic storage container comprising a plurality of storage domains along one axis against a plurality of rows of stripes along another axis defining a preselected storage capacity, and configuration information allocating the stripes in response to a storage format specified by an allocation request. A method is provided for storing the data, comprising: providing the generic storage container; providing configuration information adapted for selectively allocating the stripes in relation to a data storage format; specifying a desired storage format; and allocating the stripes in response to the desired format.

21 Claims, 12 Drawing Sheets

U.S. PATENT DOCUMENTS

| | | |
|---|---|---|
| 6,101,615 A | 8/2000 | Lyons |
| 6,154,853 A | 11/2000 | Kedem |
| 6,154,854 A | 11/2000 | Stallmo |
| 6,192,448 B1 * | 2/2001 | Mansur .................. 711/112 |
| 6,195,695 B1 | 2/2001 | Cheston et al. |
| 6,219,753 B1 | 4/2001 | Richardson |
| 6,247,157 B1 | 6/2001 | Edirisooriya |
| 6,275,898 B1 | 8/2001 | DeKoning |
| 6,327,672 B1 | 12/2001 | Wilner |
| 6,338,126 B1 | 1/2002 | Ohran et al. |
| 6,353,895 B1 | 3/2002 | Stephenson |
| 6,356,979 B1 | 3/2002 | Sicola et al. |
| 6,378,038 B1 | 4/2002 | Richardson et al. |
| 6,425,052 B1 | 7/2002 | Hashemi |
| 6,453,428 B1 | 9/2002 | Stephenson |
| 6,457,140 B1 | 9/2002 | Lindberg et al. |
| 6,476,830 B1 | 11/2002 | Farmer et al. |
| 6,487,633 B1 | 11/2002 | Horst et al. |
| 6,502,166 B1 | 12/2002 | Cassidy |
| 6,529,994 B1 | 3/2003 | Bleidt et al. |
| 6,557,123 B1 | 4/2003 | Wiencko, Jr. et al. |
| 6,574,687 B1 | 6/2003 | Teachout et al. |
| 6,675,176 B1 | 1/2004 | Shinkai et al. |
| 6,675,318 B1 | 1/2004 | Lee |
| 6,742,137 B1 | 5/2004 | Frey, Jr. |
| 6,745,284 B1 | 6/2004 | Lee et al. |
| 6,754,785 B2 | 6/2004 | Chow et al. |
| 6,792,391 B1 | 9/2004 | Nanda |
| 2003/0188097 A1 | 10/2003 | Holland et al. |
| 2004/0205387 A1 | 10/2004 | Kleiman et al. |

FOREIGN PATENT DOCUMENTS

| | | |
|---|---|---|
| WO | WO 2004/046971 A1 | 6/2004 |

* cited by examiner

170

| Version \ Data Storage Device | A | C | E | G | I | B | D | F | H | J |
|---|---|---|---|---|---|---|---|---|---|---|
| SV1 | d | d | d | d | s | d | d | d | d | s |
| SV2 | d | d | d | s | d | d | d | d | s | d |
| SV3 | d | d | s | d | d | d | d | s | d | d |
| SV4 | d | s | d | d | d | d | s | d | d | d |
| SV5 | s | d | d | d | d | s | d | d | d | d |

| A | C | E | G | B | D | F | H |
|---|---|---|---|---|---|---|---|
| A | C | E | G | B | D | F | H |
| A | C | E | G | B | D | F | H |
| A | C | E | G | B | D | F | H |
| A | C | E | G | B | D | F | H |
| A | C | E | G | B | D | F | H |
| A | C | E | G | B | D | F | H |
| A | C | E | G | B | D | F | H |

| Data A-1 | Data A-2 | Data A-3 | Data A-4 | Data I-1 | Data I-2 | Data I-3 | Data I-4 |
|---|---|---|---|---|---|---|---|
| Data B-1 | Data B-2 | Data B-3 | Data B-4 | Data J-1 | Data J-2 | Data J-3 | Data J-4 |
| Data C-1 | Data C-2 | Data C-3 | Data C-4 | Data K-1 | Data K-2 | Data K-3 | Data K-4 |
| Data D-1 | Data D-2 | Data D-3 | Data D-4 | Data L-1 | Data L-2 | Data L-3 | Data L-4 |
| Data E-1 | Data E-2 | Data E-3 | Data E-4 | Data M-1 | Data M-2 | Data M-3 | Data M-4 |
| Data F-1 | Data F-2 | Data F-3 | Data F-4 | Data N-1 | Data N-2 | Data N-3 | Data N-4 |
| Data G-1 | Data G-2 | Data G-3 | Data G-4 | Data O-1 | Data O-2 | Data O-3 | Data O-4 |
| Data H-1 | Data H-2 | Data H-3 | Data H-4 | Data P-1 | Data P-2 | Data P-3 | Data P-4 |

| Data P-1 | Data P-2 | Data P-3 | Data P-4 | Data H-1 | Data H-2 | Data H-3 | Data H-4 |
|---|---|---|---|---|---|---|---|
| Data O-1 | Data O-2 | Data O-3 | Data O-4 | Data G-1 | Data G-2 | Data G-3 | Data G-4 |
| Data N-1 | Data N-2 | Data N-3 | Data N-4 | Data F-1 | Data F-2 | Data F-3 | Data F-4 |
| Data M-1 | Data M-2 | Data M-3 | Data M-4 | Data E-1 | Data E-2 | Data E-3 | Data E-4 |
| Data L-1 | Data L-2 | Data L-3 | Data L-4 | Data D-1 | Data D-2 | Data D-3 | Data D-4 |
| Data K-1 | Data K-2 | Data K-3 | Data K-4 | Data C-1 | Data C-2 | Data C-3 | Data C-4 |
| Data J-1 | Data J-2 | Data J-3 | Data J-4 | Data B-1 | Data B-2 | Data B-3 | Data B-4 |
| Data I-1 | Data I-2 | Data I-3 | Data I-4 | Data A-1 | Data A-2 | Data A-3 | Data A-4 |

FIG. 12

| | | | | | | | |
|---|---|---|---|---|---|---|---|
| A-1 | A-2 | A-3 | A-4 | E-5 | E-6 | E-7 | E-8 |
| B-8 | B-1 | B-2 | B-3 | F-4 | F-5 | F-6 | F-7 |
| C-7 | C-8 | C-1 | C-2 | G-3 | G-4 | G-5 | G-6 |
| D-6 | D-7 | D-8 | D-1 | H-2 | H-3 | H-4 | H-5 |
| I-10 | I-9 | I-12 | I-11 | M-14 | M-13 | M-16 | M-15 |
| J-9 | J-16 | J-11 | J-10 | N-13 | N-12 | N-15 | N-14 |
| K-16 | K-15 | K-10 | K-9 | O-12 | O-11 | O-14 | O-13 |
| L-15 | L-14 | L-9 | L-16 | P-11 | P-10 | P-13 | P-12 |

| | | | | | | | |
|---|---|---|---|---|---|---|---|
| 13P | 5P | 15P | 7P | 9P | 1P | 11P | 3P |
| 14P | 6P | 16P | 8P | 10P | 2P | 12P | 4P |

| | | | | | | | |
|---|---|---|---|---|---|---|---|
| EP | MP | FP | NP | AP | IP | BP | JP |
| GP | OP | HP | PP | CP | KP | DP | LP |

FIG. 13

| 200 | 202 | 204 | 206 | 208 |
|---|---|---|---|---|
| Data 1 | Data 1 | Data 1 | Data 1 | Data 1 |
| Data 2 | Data 2 | Data 2 | Data 2 | Data 2 |
| Data 3 | Data 3 | Data 3 | Data 3 | Data 3 |
| Data 4 | Data 4 | Data 4 | Data 4 | Data 4 |
| Data 5 | Data 5 | Data 5 | Data 5 | Data 5 |
| Data 6 | Data 6 | Data 6 | Data 6 | Data 6 |
| Data 7 | Data 7 | Data 7 | Data 7 | Data 7 |
| Data 8 | Data 8 | Data 8 | Data 8 | Data 8 |
| Data 9 | Data 9 | Data 9 | Data 9 | Data 9 |
| Data 10 | Data 10 | Data 10 | Data 10 | Data 10 |
| Data 11 | Data 11 | MData 10 | Data 11 | Data 11 |
| Data 12 | Data 12 | MData 9 | Data 12 | Data 12 |
| Data 13 | Data 13 | MData 8 | Data 13 | Data 13 |
| Data 14 | Data 14 | MData 7 | Data 14 | Data 14 |
| Data 15 | Data 15 | MData 6 | Data 15 | Data 15 |
| Data 16 | MData 15 | MData 5 | Data 16 | Data 16 |
| Data 17 | MData 14 | MData 4 | Data 17 | Data 17 |
| Data 18 | MData 13 | MData 3 | Data 18 | Data 18 |
| Data 19 | MData 12 | MData 2 | Data 19 | Data 19 |
| Data 20 | MData 11 | MData 1 | Data 20 | Data 20 |
| Data 21 | MData 10 | MData 10' | Data 21 | VP 17-20 |
| Data 22 | MData 9 | MData 9' | Data 22 | VP 13-16 |
| Data 23 | MData 8 | MData 8' | Data 23 | VP 9-12 |
| Data 24 | MData 7 | MData 7' | Data 24 | VP 5-8 |
| Data 25 | MData 6 | MData 6' | RP 21-24 | VP 1-4 |
| Data 26 | MData 5 | MData 5' | RP 17-20 | RP 17-20 |
| Data 27 | MData 4 | MData 4' | RP 13-16 | RP 13-16 |
| Data 28 | MData 3 | MData 3' | RP 9-12 | RP 9-12 |
| Data 29 | MData 2 | MData 2' | RP 5-8 | RP 5-8 |
| Data 30 | MData 1 | MData 1' | RP 1-4 | RP 1-4 |

FIG.14

GENERIC STORAGE CONTAINER FOR ALLOCATING MULTIPLE DATA FORMATS

FIELD OF THE INVENTION

The present embodiments relate generally to data storage systems and more particularly, but without limitation, to dynamically storing data in different storage formats within a generic storage capacity.

BACKGROUND

Data storage systems can comprise a central processing unit (CPU), one or more disc controllers and a plurality of disc drives. Computer program code operating on the CPU and/or disc controllers controls the manner in which user data is stored and accessed on the disc drives. User data can be stored in various data storage formats, such as redundant array of independent drive (RAID) formats, for example. Multiple RAID formats can be concurrently employed within the data storage system. The optimal RAID format employed for particular data files can reflect the importance of the data and the frequency of access or update. Data that is easily accessed from other sources or otherwise reacquired can be stored in a non fault-tolerant format such a RAID 0, for example. Data that is stored in a fault tolerant format that is accessed frequently can be stored in a RAID 1 format. Data stored in a fault tolerant format that is accessed less frequently can be stored in a RAID 5 format. Alternatively RAID 5 can be employed to provide greater storage capacity as compared to RAID 1. Data such as financial data or system configuration data can be stored in a RAID 6 or Raid 1×3 format that provides greater redundancy than RAID-1 or RAID-5. As such, there can exist the need for a plurality of data storage formats to be concurrently supported within the system storage capacity. Also, it can be advantageous to change dynamically from a first storage format to a second storage format. For example, RAID 1 can be advantageously employed to update daily billing records, and then converted to RAID 5 format for archival storage. The rate at which storage can be dynamically allocated and the efficiency of utilization of available storage capacity significantly affects the marketability and profit margin of a data storage system.

SUMMARY OF THE INVENTION

As embodied herein and as claimed below, the present embodiments are generally directed to a device and associated method for storing data in a plurality of data storage formats wherein each format employs a same predefined data storage structure.

In some embodiments a generic storage container system is provided for a grid-based storage architecture, comprising a storage container comprising a plurality of storage domains along one axis against a plurality of rows of stripes along another axis defining a preselected storage capacity, and configuration information allocating the stripes in response to a storage format specified by an allocation request.

In some embodiments a method is provided for storing data in a data storage system, comprising: providing a storage container comprising a plurality of storage domains along one axis against a plurality of rows of stripes along another axis defining a preselected storage capacity; providing configuration information adapted for selectively allocating the stripes in relation to a data storage format; specifying a desired storage format; and allocating the stripes in response to the desired format.

In some embodiments a data storage system is provided comprising a data storage grid defining data stripes across a plurality of domains, and means for configuring the data stripes in relation to a desired data storage format.

These and various other features and advantages which characterize the embodiments of the claimed invention will become apparent upon reading the following detailed description and upon reviewing the associated drawings.

BRIEF DESCRIPTION OF THE DRAWINGS

FIG. 9 diagrammatically depicts a sheet organization table for a plurality of grids.

FIG. 10 diagrammatically depicts a data storage grid produced by applying the sheet organization table of FIG. 9 to the grid of FIG. 8.

FIG. 11 diagrammatically depicts a user data grid.

FIG. 12 diagrammatically depicts a RAID 1 mirror grid for the user data grid of FIG. 11.

FIG. 13 diagrammatically depicts user/parity map that can be employed for RAID 5 and RAID 6 formats.

FIG. 14 diagrammatically depicts allocation maps for sheets of data storage capacity employing thirty grids in different RAID formats.

DETAILED DESCRIPTION

Figure 1:
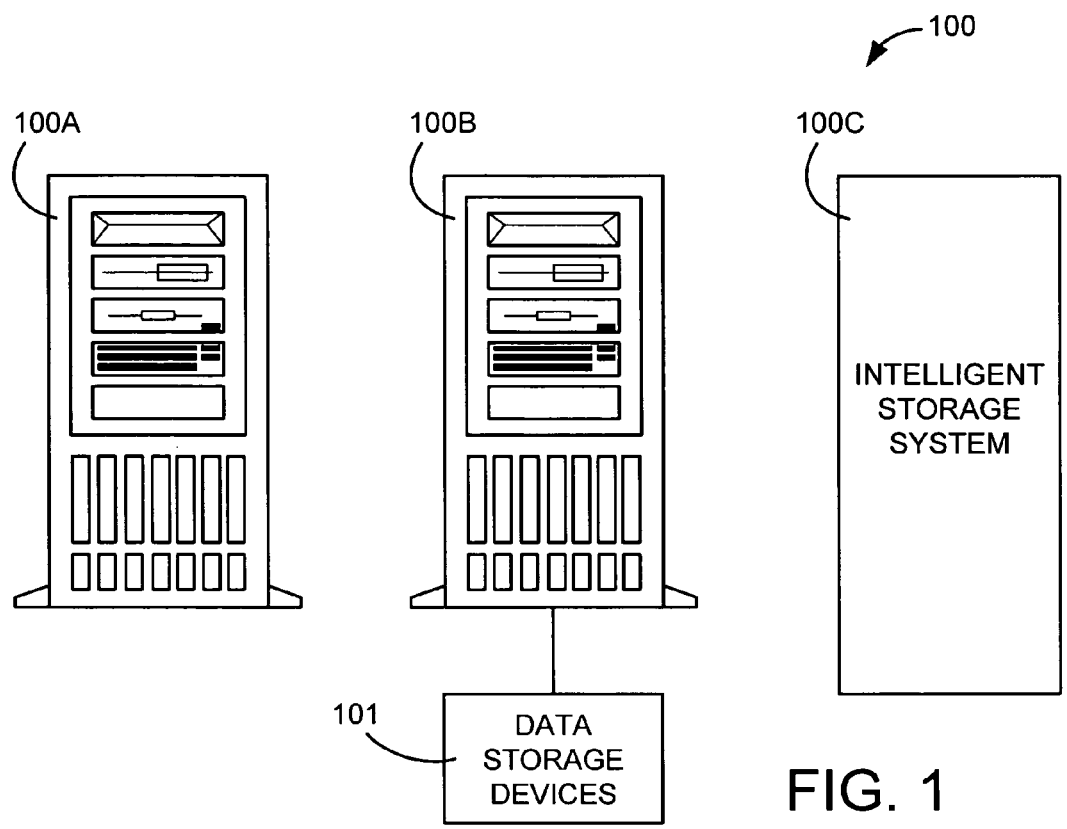
FIG. 1 is a diagrammatical depiction of exemplary operating systems in which various embodiments of the present invention can be employed.

FIG. 1 depicts exemplary operating systems in which embodiments of the present invention can be employed, such as in a computer 100A, or in a server 100B with internal or attached data storage devices 101, or in an intelligent storage system 100C. Intelligent storage system 100C is representative of storage systems that can have intelligent controllers and interfaces and that can have one or more data storage arrays.

Operating systems 100 each contain at least one CPU, a plurality of data storage devices 101 defining a data storage capacity, and metadata describing the configuration of the data storage capacity. By "configuration" it is meant that a description is provided to the system 100 regarding whether particular portions of the storage capacity are being used to store data, or "allocated" space, as opposed to the portions that are available for storing data, or "allocatable" space.

Other operating systems suited for use with various embodiments of the present invention include additional data storage devices 101, additional data storage arrays, additional data storage device controllers or network interface controllers, and the like, that are not depicted in FIG. 1. For example, embodiments of the present invention can be used in a system 100 that includes at least two data storage devices 101 and one controller. Embodiments of the present invention can be employed in simple systems having little or no fault tolerance redundancy to highly redundant systems having no single point of failure.

Figure 2:
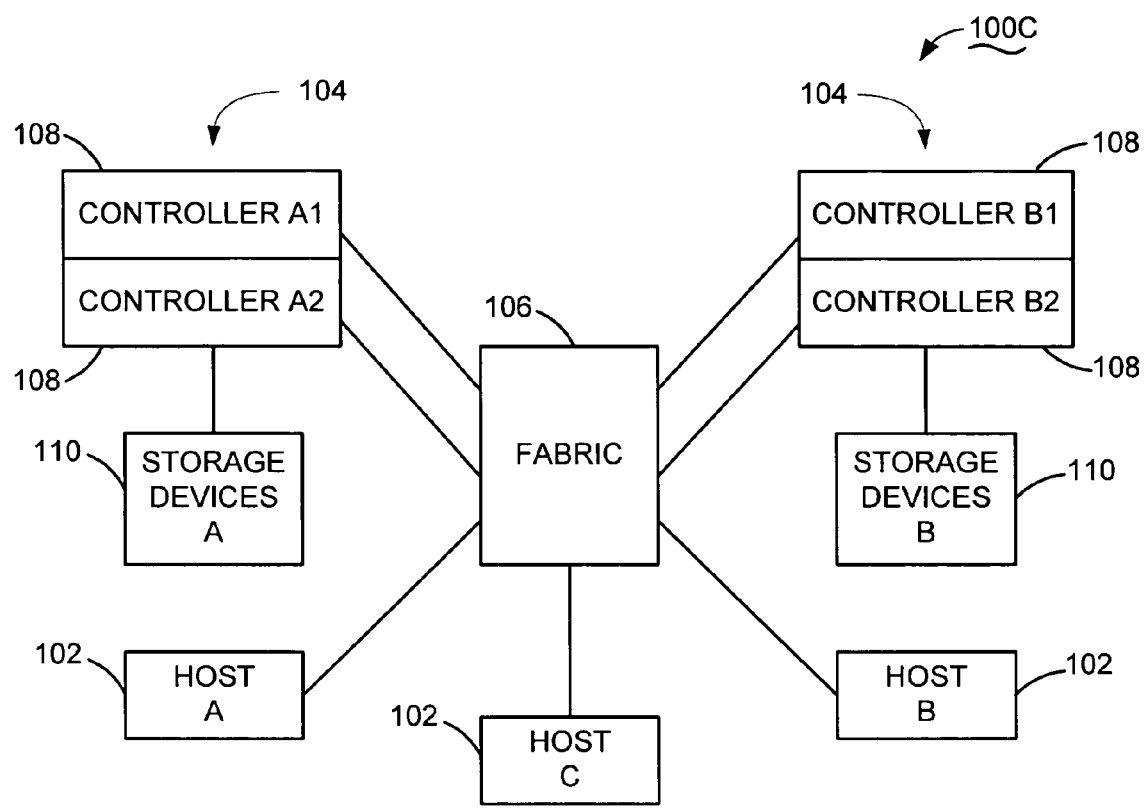
FIG. 2 is a top level functional block depiction of a computer-based system characterized as a wide-area network utilizing mass storage.

To illustrate an exemplary environment in which presently preferred embodiments of the present invention can be advantageously practiced, FIG. 2 shows a computer-based system 100C characterized as a wide area network (WAN) utilizing mass storage.

The system 100C includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well, including the Internet.

Each array 104 includes a pair of controllers 108 (denoted A1, A2 and B1, B2) and a set of data storage devices 101 preferably characterized as disc drives operated as a RAID. The controllers 108 and data storage devices 101 preferably utilize a fault tolerant arrangement so that the various controllers 108 utilize parallel, redundant links and at least some of the user data stored by the system 100C is stored in a redundant format within at least one set of the data storage devices 101.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

Figure 3:
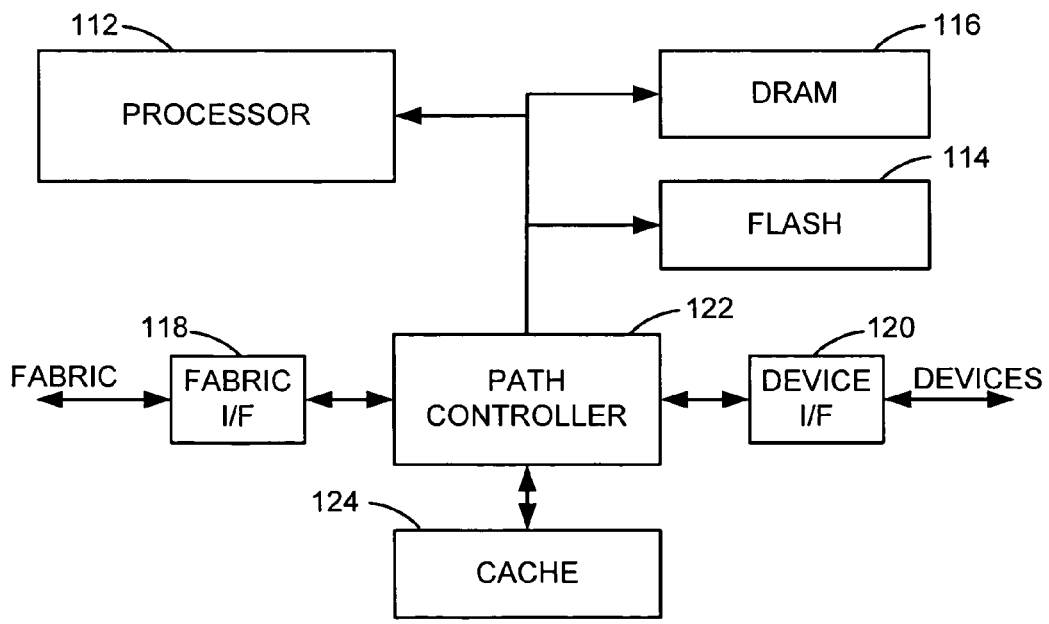
FIG. 3 provides a functional block diagram illustrating a selected one of the controllers of FIG. 2.

FIG. 3 illustrates a selected one of the controllers 108 in greater detail. The controller 108 can be embodied in a single integrated circuit, or distributed among a number of discrete circuits as desired. A main processor 112, preferably characterized as a programmable, computer processor, provides control in accordance with programming steps and processing data preferably stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 101. The I/F circuits 118, 120 and a path controller 122 form a communication path to pass commands and data between the storage array 104 and the host 102, such as by employing the cache memory 124. Although illustrated discretely, it will be understood that the path controller 122 and the I/F circuits 118, 120 can be unitarily constructed.

The data storage capacity of an array 104, defined by the extent of the data storage devices 101 in a given array 104, is organized into logical units (LUNs) that can be written to and read from the array 104. System configuration information defines the relationship between user data, including any associated parity and mirror data, with the respective storage locations. The system configuration information furthermore identifies the relationship between blocks of storage capacity allocated to user data and the memory storage locations, such as logical block addresses (LBA). The system configuration information can furthermore include virtualization by defining virtual block addresses that are mapped to LBAs.

System configuration information is changed in response to a configuration change request from the system 100C. In response, storage capacity can be allocated, such as when saving new files or enlarging existing files, or storage capacity can be deallocated, such as when deleting files or reducing the size of existing files. For purposes of this description and the appended claims, the term "allocation" means either an allocation or deallocation of storage capacity. System metadata is resultant data defining file allocation information states and other data structures that support allocation processes.

Figure 4:
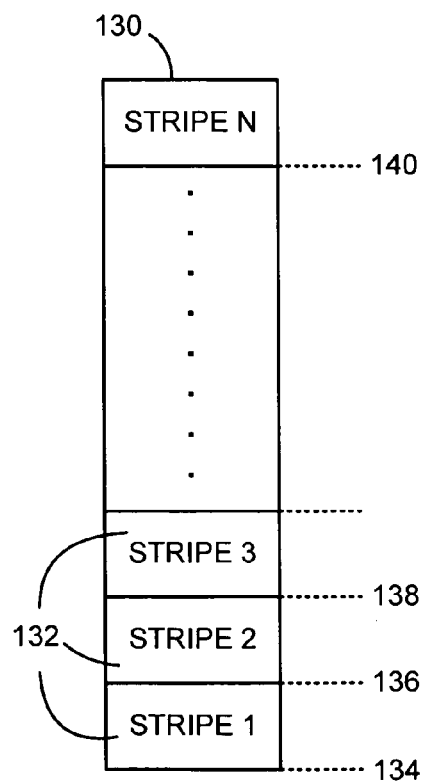
FIG. 4 is a diagrammatical depiction of a data storage device memory.

FIG. 4 is a diagrammatical representation of data storage device 101 overview in terms of a storage map 130 showing a portion of the storage capacity contained on a data storage device 101 (FIG. 1). The storage map 130 depicts stripes 132, each containing a predefined portion of the storage capacity. The amount of storage capacity in stripes 132 can reflect the type of storage applications of the system. Each stripe 132 starts at an LBA. For purposes of illustration, stripe 1 begins at LBA 134, stripe 2 begins at LBA 136, and stripe 3 begins at LBA 138. A plurality of other stripes can be defined up to Stripe N that begins at LBA 140. Preferably, the end of one stripe 132 is immediately adjacent the next stripe 132 so that there is no unused storage capacity between adjacent stripes 132.

Figure 5:
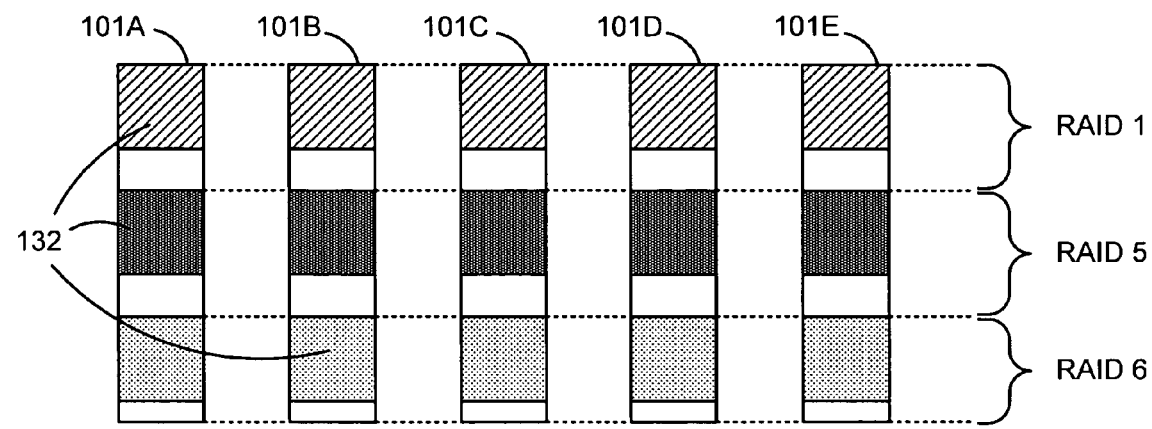
FIG. 5 diagrammatically illustrates a static capacity assignment arrangement for a storage capacity supporting multiple RAID formats.

FIG. 5 illustrates a statically assigned arrangement of multiple data storage formats within the data storage capacity. In such an arrangement, a prediction is made as to what type of data storage format, such as RAID format, is best suited for the data being stored. Corresponding proportions of the storage capacity are then dedicated to the respective RAID formats according to the prediction. In the end, an entire data storage device 101 can be designated for one RAID format or partitioned according to a multitude of RAID formats, but the ability to use the entire capacity of the data storage device lies in the accuracy of the prediction.

Figure 6:
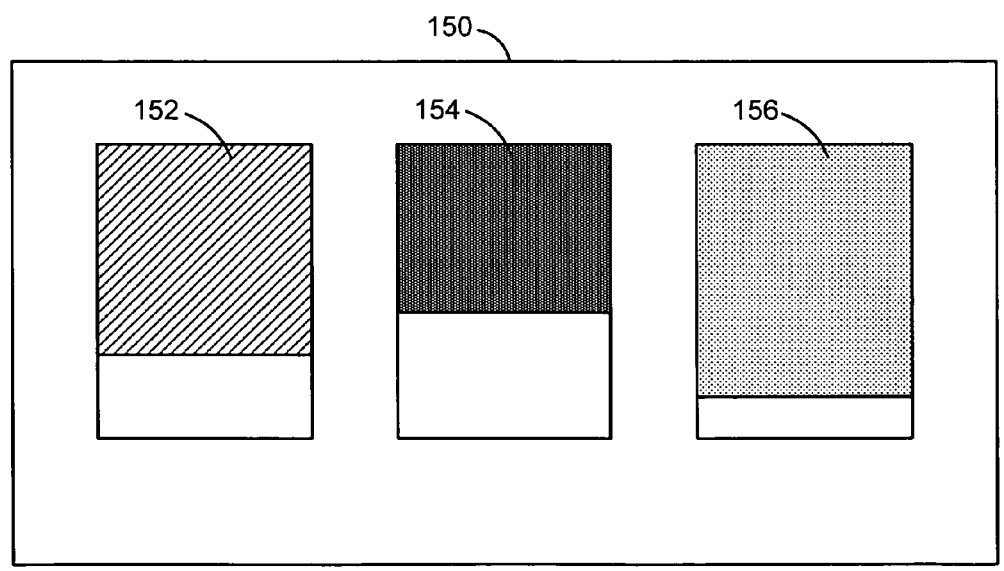
FIG. 6 diagrammatically illustrates a sample utilization of the static capacity arrangement of FIG. 5.

FIG. 5 illustrates a static capacity assignment for five data storage devices 101A, 101B, 101C, 101D, 101E forming stripes 132 that are collectively partitioned for use in either a RAID 1, RAID 5, or RAID 6 format. As noted above, the partitioning between storage formats is based on a predicted need for the different storage formats for storing data. A utilization analysis 150 shown in FIG. 6 illustrates a representative usage of available storage capacity according to the designated RAID format. That is, graph 152 shows that about 80% of the RAID 1 formatted storage capacity is utilized, graph 154 shows that at the same time about 60% of the RAID 5 formatted capacity being utilized, while graph 156 indicates that about 90% of the RAID 6 formatted capacity is being utilized. In this case the prediction upon which the static capacity assignment was made might be suspect because of the uneven utilization of the storage capacity among the different storage formats.

Figure 7:
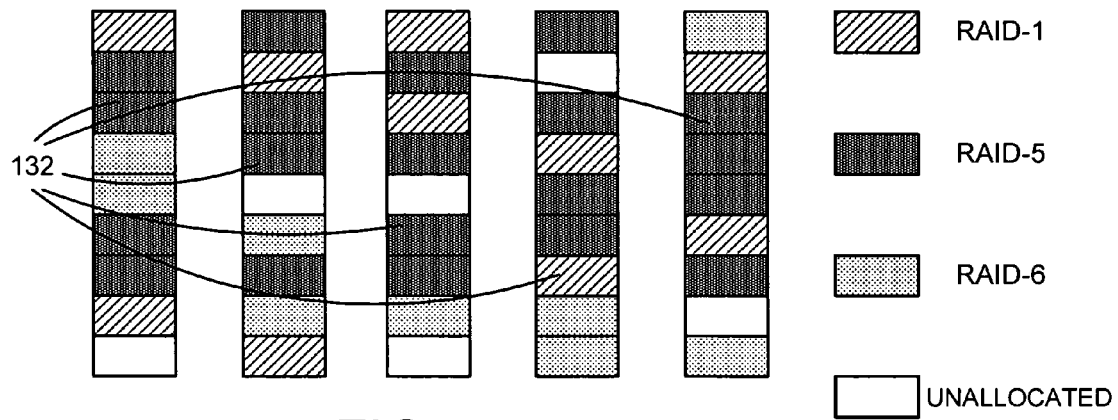
FIG. 7 diagrammatically illustrates a dynamic capacity assignment arrangement for a storage capacity supporting multiple RAID formats.

FIG. 7 contrarily illustrates a dynamic capacity assignment for the five data storage devices 101A, 101B, 101C, 101D, 101E forming stripes 132 that can be individually allocated to accommodate a RAID 1, RAID 5, and RAID 6 format. This permits the allocation of storage capacity according to utilization, rather than prediction. However, a dynamic capacity arrangement can complicate the metadata schemes and diminish overall system performance. This is due in part to the fragmentation associated with changing the allocation of storage capacity from one format to another, because different RAID formats use different numbers of stripes 132 to store the same amount of data. Cleaning up the fragmentation consumes a significant number of input-output (I/O) processes, resulting in a reduced rate of storage allocation and user access.

Embodiments of the present invention enable the dynamic capacity assignment, by providing a generic storage container defining a preselected capacity, but which is allocatable for use with multiple storage formats. The container is termed a grid, and a plurality of commonly allocated grids is termed a sheet of data storage capacity. Accordingly, by fixing the size of each grid, the specified storage capacity incident with an allocation request is determinative of the number of grids within a sheet of storage capacity needed to satisfy the request.

Figure 8:
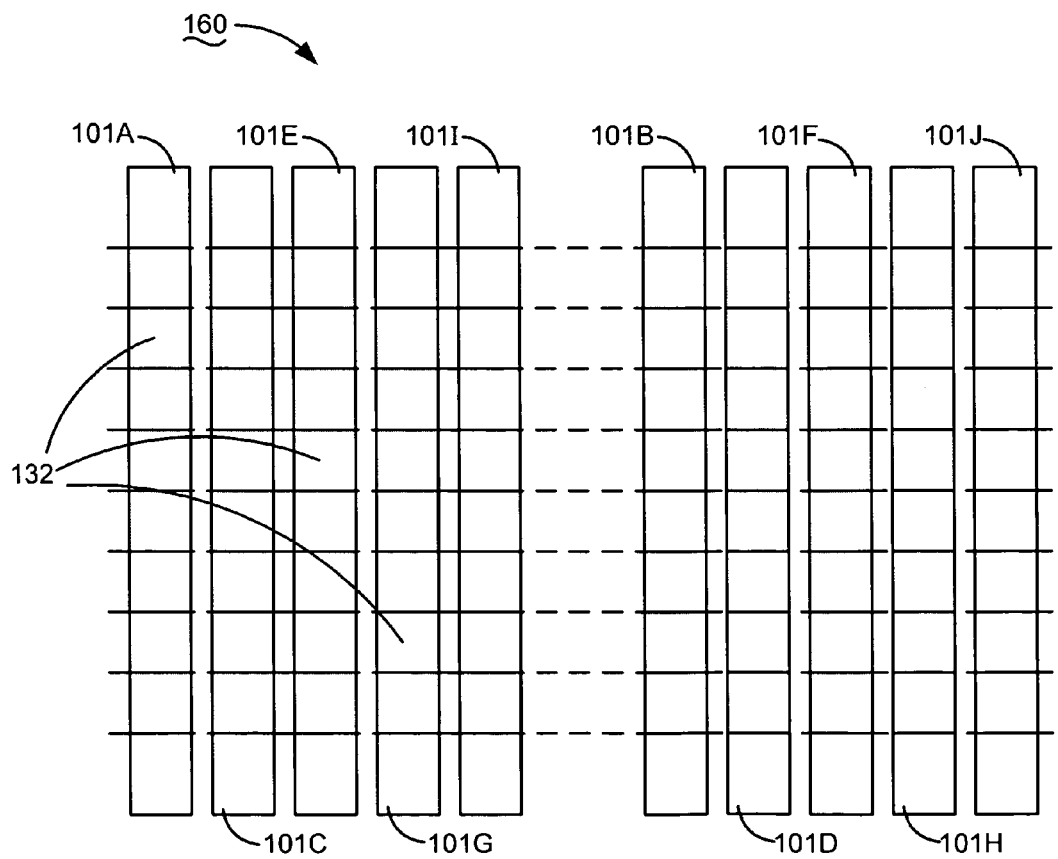
FIG. 8 diagrammatically depicts grid-based storage capacity.

FIG. 8 depicts a grid 160 that is generally representative of a grid-based data storage architecture. The grid 160 is an array in terms of a plurality of storage domains (data storage devices 101A-101J) along one axis against rows of a plurality of stripes 132 along the other axis. One of the stripes 132 is defined at each row-column intersection. Stripes 132 in one row can start at the same or at different LBAs.

Spare capacity is distributed across sub-partitions of data storage devices 101. Accordingly, stripes 132 in some sub-partitions (101A-101H) are used to store data, and in other sub-partitions (101I, 101J) are used as spares. Stripes 132 containing data store such things as user data, minor data, or parity data. Minor and parity data is sometimes referred to herein as fault tolerance information. Spare stripes 132 can be employed to restore data from a failed drive. Spare stripes 132 can be configured to exist only on specific data storage devices 101. For example, the grid 160 of FIG. 7 illustrates the data storage devices 101I and 101J as containing all the spare stripes 132. Alternatively, the spare stripes 132 can be distributed across some or all data storage devices 101 in a predetermined manner. In some embodiments the grid 160 has no spare stripes 132. As discussed above, a group of consecutive grids 160 is termed a sheet of data storage capacity. The sub-partitions align with the sheets, and are termed "sheet cells" ("scells"). The data storage devices 101 employed to form a data storage grid 160 is termed a book.

Preferably, the designation of spare sub-partitions 132 can vary from one grid 160 to the next. This serves to distribute data across all data storage devices 101 and allows all data storage devices 101 to be accessing data, offering higher performance in multitasking environments. The designation of which data storage devices 101 provide spare stripes 132 can be provided, as shown in FIG. 9, by a sheet organization table 170. The illustrative arrangement of FIG. 9 employs 10 data storage devices 101A-101J, with a spare capacity equal to two data storage devices 101 distributed across all 10 data storage devices 101. The sheet organization table 170 maintains the relationship between data storage device 101 and sheet version indices. The designation of which data storage devices 101 provide spare data stripes 132, as indicated by the letter "s," and which data storage devices 101 provide data stripes 132 (that can contain user data, mirror data, or parity data), as indicated by the letter "d," changes for each sheet organization version in a regular and predetermined fashion. As noted previously, this allows data stripes 132 and spare stripes 132 to be distributed across all data storage devices 101 in an even manner, allowing all data storage devices 101 to be simultaneously accessing data in a multithreaded environment, offering higher performance than systems where spare stripes 132 are contained only on some data storage devices 101.

In embodiments where two or more data storage devices 101 provide spare capacity for each sheet and sparing version, data storage devices 101 can be organized into groups and pairs. In sheet organization table 170, for example, data storage devices 101A and 101B, 101C and 101D, 101E and 101F, 101G and 101H, and 101I and 101J form pairs and sparing can be defined such that stripes 132 of the paired data storage devices 101 have the same sparing designation for each sheet organization version. Data storage devices 101 can also be organized into groups. In sheet organization table 170, for example, a first group 172 contains data storage devices 101A, 101C, 101E, 101G, and 101; a second group 174 contains drives 101B, 101D, 101F, 101H and 101J.

Pairing can be employed for a RAID 1 format such that one member of the pair contains user data (primary data) and the other member of the pair contains an identical copy in the form of mirror data (secondary data). Grouping can be employed for a RAID 5 format such that user data is stored in one group 172, 174 and parity data is stored in the other group 172, 174. As such, pairing and grouping of data storage devices can be advantageously employed when defining fault tolerant data storage formats. The pairing and grouping of FIG. 9 is exemplary and there is no constraint as to which data storage devices 101 form pairs or groups, but preferably a given data storage device 101 (all partitions thereof) is always paired with one and only one particular other data storage device 101 in order to provide strict RAID 1 redundancy. If a data storage device 101 fails, data from functioning data storage devices 101 can be copied or reconstructed (calculated from accessible data and/or parity values) and written to spare data stripes 132 specified by the sheet organization version. While FIG. 9 depicts a table to illustrate sheet organizations, embodiments of the present invention can employ other data structures or can be implemented in computer program code.

Sheet organization versions can change on grid or sheet boundaries or can change for a predetermined number of grids or sheets. The starting address of a sheet can be divided by the number of grids 160 per sheet and the remainder of the division operation can be used to determine a sheet organization version. Other calculation methods can be employed and the result may be offset. Sheet organization table 170 can be a circular table that repetitively cycles through all versions. For example, a sixth sheet (not shown) can employ the same sheet organization version as a first sheet in the sheet organization table 170. The sheet organization table 170 can be modified to accommodate other grid 160 organizations reflecting a different number of data storage devices 101 and/or sparing capacity. Other data structures, other data storage device 101 or sparing order, or software program code can be employed to achieve the distribution of sparing capacity. The sheet organization table 170 allows sparing to be implemented in a simple and regular manner, and the sparing used for any grid 160 to be easily determined. While sheet organization table 170 depicts distributed sparing, embodiments of the present invention can be employed with dedicated spares, or with no spare capacity.

FIG. 10 depicts a data storage grid 180 produced by applying sheet organization version 1 (SV1) to the grid 160. As above, each intersection in the data storage grid 180 represents a stripe 132, and the letter within each rectangle denotes the data storage device 101 containing the respective stripe 132. As noted previously, a plurality of data storage grids 180 can be organized into a grouping termed a sheet. Each grid 180 within the sheet can be allocated to store user data, mirror data, or parity data in predetermined grid 180 locations, depending upon the storage format, such as RAID format, of the sheet. Sheets typically contain data in one storage format, but during some operations, such as RAID level conversion, for example, more than one storage format can exist concurrently within a sheet.

Again, the data storage grid 180 can be allocated to store user data or fault tolerant data. For example, FIG. 11 depicts a data storage grid 180 containing all user data (referred to as a "user data grid"). The lettering of the user data stripes 132 serves as an index. However, data can be written into the user data grid in any order. It will also be recognized that if the RAID format within a sheet is changed, the user data grid might be subsequently used to store fault tolerance information.

FIG. 12 depicts a data storage grid 180 that is allocated as a RAID 1 mirror data grid for the user data grid of FIG. 11. That is, user data from the left side of the user data grid (FIG. 11) is mirrored in the right side of the mirror data grid (FIG. 12). The left and right sides of these grids preferably correspond to the groups 172, 174 described in FIG. 9. More generally, for each user data stripe 132 in the grid 180 of FIG. 11 there is a corresponding mirror data stripe 132 in the grid 180 of FIG. 12. For example, mirror data stripe 132 denoted A-1 in the mirror data grid corresponds to the user data stripe 132 denoted A-1 in the user data grid. The system configuration information in accordance with embodiments of the present invention must map a mirror data stripe 132 to a different data storage device 101 than that which contains the corresponding user data stripe 132 in order to provide fault tolerance. However, mirror data stripes 132 can be allocated in a different arrangement than that depicted in equivalent alternative embodiments.

FIG. 13 illustrates a user/parity map 190 that can be advantageously employed for allocating data storage capacity in RAID 5 and RAID 6 formats. The user/parity map 190 is similar to the user data grid (FIG. 11) but includes additional index information. Each stripe 132 in the data storage grid 180 contains a letter index and a number index. The letter indices specify row parity stripe sets for a RAID 5 format that are used to generate row parity stripes 132 within a row parity grid 192. For example, user data stripes 132 denoted as A-1, A-2, A-3 and A-4 can be XOR'ed (logically exclusive OR'ed) to produce stripe 132 denoted as AP in row parity grid 192. The number indices specify column parity stripe sets employed to generate column parity stripes 132 in a column parity grid 194 for a RAID 6 format. For example, user data stripes 132 denoted as A-1, B-1, C-1 and D-1 can be XOR'ed to produce the stripe 132 denoted as 1P in column parity grid 194. The eight rows of the user data grid are used to generate two rows in the row parity grid 192 and two rows in the column parity grid 194.

It will be noted that if a data storage grid 180 contains only parity values, such as the row parity grid 192 and the column parity grid 194, then one parity grid accommodates four user data grids. That is, a RAID 5 format comprises user data and row parity such that there is one row parity grid for every four user data grids. A RAID-6 format comprises user data and row/column parities such that there is one row parity grid and one column parity grid for every four user data grids.

FIG. 14 depicts allocation maps for sheets 200, 202, 204, 206, and 208, each employing thirty data storage data grids 180 and configured according to RAID 0, RAID 1×2, RAID 1×3, RAID 5, and RAID 6, respectively. For a RAID 0 format, each data storage grid 180 of the sheet 200 contains user data, denoted Data 1-30. For a RAID 1×2 format, fifteen data storage grids 180 contain user data, denoted Data 1-15, and fifteen data storage grids 180 contain mirror data, denoted MData 1-15. For a RAID 1×3 format, ten data storage grids 180 contain user data, denoted Data 1-10, ten data storage grids 180 contain mirror data, denoted Mdata 1-10, and ten data storage grids 180 contain alternate mirror data, denoted Mdata 1'-10'. Alternate mirror data employs a different ordering of stripes 132 within the data storage grid 180 than the mirror data, while still maintaining the user data, mirror data, and alternate mirror data as being stored in different data storage devices 101 in order to provide fault tolerance. For a RAID 5 format, twenty-four data storage grids 180 contain user data, denoted as Data 1-24, and six data storage grids 180 contain row parity, denoted RP 1-4 to RP21-24. For a RAID 6 format, twenty data storage grids 180 contain user data, denoted as Data 1-20, five data storage grids 180 contain row parity, denoted RP 1-4 to RP 17-20, and five data storage grids 180 contain column parity, denoted CP1-4 to CP 17-20.

It will be noted that there is some commonality between different storage formats that can be leveraged in converting from one format to another. Also, all the maps illustrate a "packed parity" arrangement where user data is stored exclusively in one portion of a sheet and mirror or parity data (if any) is stored in another portion of the sheet. This provides increased sequential read performance. The user data grids (FIG. 11) can be termed "RAID storage units, or "reliable storage units" (RSUs), wherein fault tolerance for each user data grid can be provided (depending upon RAID level) through redundant data such as mirror data or parity data in other data storage grids 180. As will be noted from the maps of FIG. 14, and summarized below, sheets of different RAID levels provide different numbers of RSUs.

TABLE 1

RSUs for Various RAID Formats

| RAID Level | Number of RSUs |
| --- | --- |
| RAID 0 | 30 |
| RAID 1 × 2 | 15 |
| RAID 1 × 3 | 10 |
| RAID 5 | 24 |
| RAID 6 | 20 |

Embodiments of the present invention contemplate providing a generic storage container by organizing the data storage capacity into predetermined size sheets. The sheets are adapted for being allocated in a manner depending upon the RAID format specified by an allocation request. The number and placement of the corresponding RSUs are then automatically allocated within the sheet.

Figures 15, 16A:
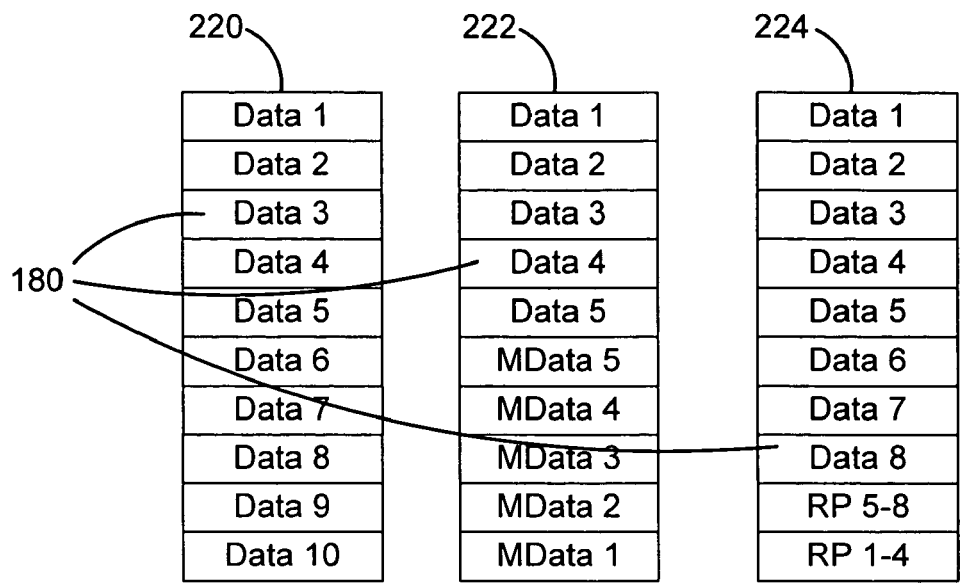
FIG. 15 diagrammatically depicts allocation maps for sheets of data storage capacity employing ten grids in different RAID formats FIGS. 16A-16C diagrammatically depict a generic storage container comprising an eight-column, five-row grid in combination with data/parity mapping for RAID 0, RAID 1, and RAID 5 formats.

The sheet architectures described above accommodate RAID 0, RAID 1, RAID 1×3, RAID 5 or RAID 6 formats. If fewer RAID formats need accommodation, simplified sheet and grid architectures can be employed to yield a generic data storage container. FIG. 15, for example, depicts allocation maps for sheets 220, 222, 224, each employing ten data storage grids 180 for accommodating RAID 0, RAID 1×2, and RAID 5 formats, respectively. For a RAID 0 format, each data storage grid 180 contains user data, denoted Data 1-10. For a RAID 1×2 format, five data storage grids 180 contain user data, denoted Data 1-5, and five data storage grids 180 contain mirror data, denoted MData 1-5. For a RAID 5 format, eight data storage grids 180 contain user data, denoted Data 1-8, and two data storage grids 180 contain row parity, denoted RP1-4 and RP5-8. From the illustrative embodiments discussed, it will be noted that depending upon the storage formats accommodated, a common denominator can be determined and leveraged in defining part of a generic storage container that efficiently (without unused stripes) maps user data and mirror data or parity data, as required by the storage format, for different storage formats. The data storage grids 180 can be allocated in an order other than that depicted in the illustrative embodiments.

Figure 16B:
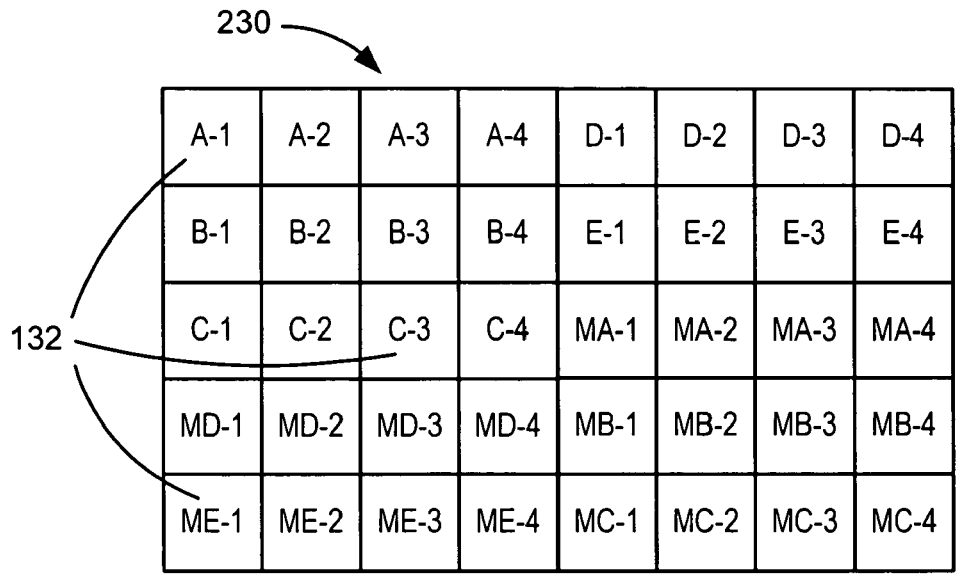
Figure 16C:
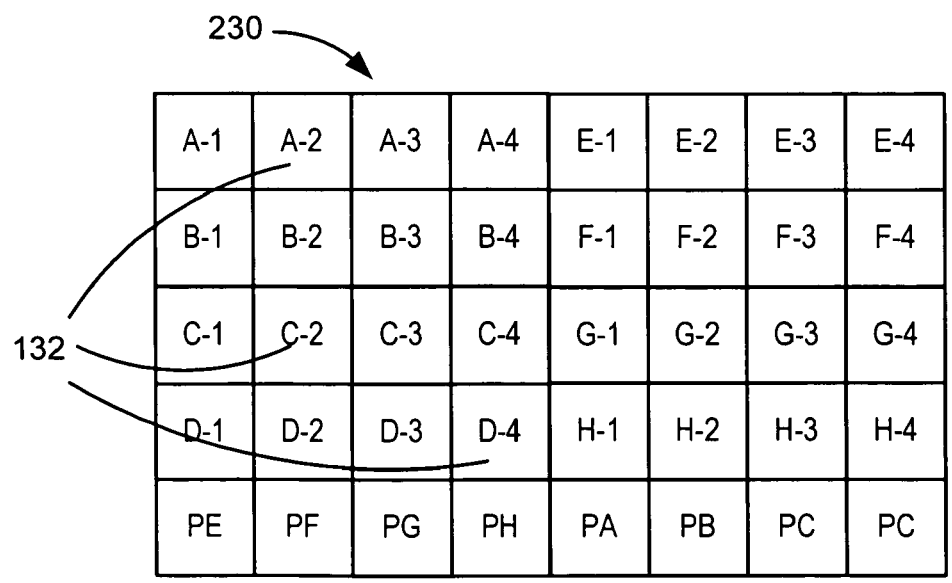

FIGS. 16A-16C depict a generic storage container 230 comprising an eight-column, five-row array, that along with system configuration information such as the allocation mapping schemes above, accommodate a RAID 0, RAID 1, and RAID 5 format. That is, the generic container 230 in FIG. 16A contains only user data for a RAID 0 format.

The generic container 230 in FIG. 16B contains user data in stripes 132 denoted A-E and mirror data in stripes 132 denoted MA-ME for a RAID 1×2 format. For example, the stripe 132 denoted MA-2 contains mirror data for the stripe 132 denoted A-2 containing the corresponding user data. This arrangement illustrates mapping wherein user data is mapped to one group 172, 174 and mirror data is mapped to another group 172, 174. Other RAID 1 mapping arrangements are possible in equivalent alternative embodiments, but each mirror data stripe 132 and corresponding user data stripe 132 pair are contained in different data storage devices 101 (denoted by column placement) in order to provide fault tolerance.

The generic container 230 in FIG. 16C accommodates a RAID 5 format. The letter and number indices denote stripes 132 containing user data. Parity data are contained in stripes 132 denoted as PA-PH. The letters of stripes 132 containing user data specify the data stripes 132 that are employed to calculate parity values. For example, data stripes 132 denoted A-1, A-2, A-3 and A-4 can be XORed to produce parity value PA. Parity values for other user data stripes 132 can be calculated in a like manner. Ordering of user data stripes 132 and parity data stripes 132 different from that shown in FIG. 16C can be employed in equivalent alternative embodiments, but each user data stripe 132 and the corresponding parity data stripe 132 must be contained in different data storage devices 101 (denoted by column placement) in order to provide fault tolerance. Grids employed in various embodiments of the present invention can employ any number of rows and any number of columns that support desired data storage formats.

Figure 17A:
FIGS. 17A-17C diagrammatically depict a generic storage container comprising a five-column, eight-row grid in combination with data/parity mapping for RAID 0, RAID 1, and RAID 5 formats.
Figure 17B:
Figure 17C:
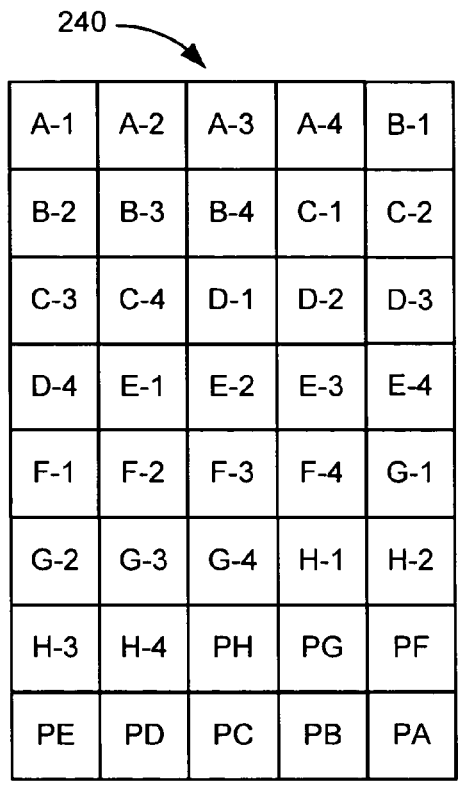

FIGS. 17A-17C depict a generic storage container 240 comprising a five-column, eight-row array, that along with system configuration information such as the allocation mapping schemes above, accommodate a RAID 0, RAID 1, and RAID 5 format. That is, the generic container 240 in FIG. 17A contains only user data for a RAID 0 format. The generic container 240 in FIG. 17B contains user data in stripes 132 denoted A-E and mirror data in stripes 132 denoted MA-ME for a RAID 1 format. The generic container 240 in FIG. 17C contains user data in stripes denoted A-H and parity data in stripes 132 denoted PA-PH for a RAID 5 format.

For data storage formats contemplated within the embodiments of the present invention, data is allocated in a predetermined manner within the data storage grid 180 and/or within the sheet containing a number of data storage grids 180. System configuration information, such as the user/parity map 190 and the allocation map 200, 202, 204, 206, 208, 220, 222, 224, defines the contents of stripes 132 and/or data storage grids 180 for the format that is specified in an allocation request. Grid format refers to the size of stripes 132 and the number of rows and columns in a data storage grid 180. Sheet format refers to the number of data storage grids 180 in a sheet. Data storage grids 180 and/or sheets of different grid and sheet formats can be employed simultaneously in the data storage capacity. For example, a video server system might advantageously employ a large grid or sheet format to store streaming video data, while employing a relatively smaller grid or sheet format to store billing information. Billing information might be stored in a highly fault tolerant format, such as a RAID 6 or a RAID 1×3 format, for example, while streaming video data might be stored in a less fault tolerant format, such as a RAID 0 or RAID 5 format.

Embodiments of the present invention provide generic storage containers that can be configured at the time of allocation to store data in a specified RAID format. This provides simplified metadata schemes, yet provides the flexibility of dynamic capacity assignment without the associated overhead or fragmentation of individual data stripe 132 management.

While foregoing examples have employed data storage devices 101 generally, embodiments of the present invention are not limited to the type of data storage device employed. Data storage devices 101 can comprise any type of data storage device including electrical, magnetic, optical, or chemical data storage devices including but not limited to hard disc drives, optical drives, WORM drives, CDROM, DVD, EEPROM, RAM drives including solid state memory devices, and the like and can include combinations thereof and further can include combinations of volatile and non-volatile data storage devices.

While disc based storage systems often include spare storage capacity, embodiments of the present invention can be employed in systems with no spare storage capacity. For example, data can be archived or otherwise stored in one or more storage formats on write only media, such as CDROM or DVD. Embodiments of the present invention simplify allocation of storage capacity when storing files in a plurality of data storage formats.

Figure 18:
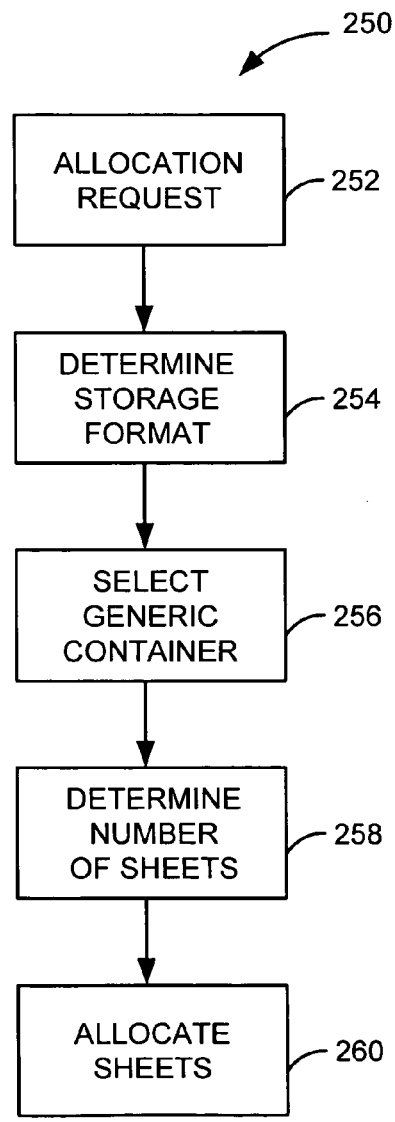
FIG. 18 is a flow chart of illustrating steps for practicing a method for ALLOCATING STORAGE CAPACITY in accordance with embodiments of the present invention.

FIG. 18 is a flow chart illustrating steps for practicing a method 250 for STORING DATA in accordance with embodiments of the present invention. The method is initiated by receipt of an allocation request from the system 100C in block 252. The allocation request specifies the data format, such as RAID format, with which the data associated with the allocation request is to be saved to the storage capacity. In block 254 the storage format is determined from the allocation request.

In block 256 a generic storage container is selected from one or more predefined candidates that accommodate the specified storage format. Given the generic storage container, which specifies the number of storage grids within the sheet, and the size of storage capacity specified by the allocation request, then in block 258 the number of sheets of storage capacity can be selected. Finally, in block 260 the sheets are allocated for storing the data in accordance with the system configuration information, such as the user/parity mapping discussed above, which defines which stripes 132 within the generic storage container are allocated for storing user data and which, if any, are allocated to store fault tolerance data.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular data container structure without departing from the spirit and scope of the present invention.

What is claimed is:

1. An apparatus comprising:
a generic storage container of a fixed-size storage capacity, the storage capacity predetermined prior to a generated allocation request associated with one of a plurality of different redundant array of independent drives (RAID) storage formats, the generic storage container defined by a plurality of rows, each row of two or more storage stripes, each stripe in the same row from a different physical storage device, and wherein each of the physical storage devices has a total storage capacity that is greater than a sum of those portions of two or more generic storage containers residing in the respective physical storage device; and
configuration information stored in a computer readable medium and executable to allocate all the stripes of the generic storage container in response to the generated allocation request and according to the associated RAID storage format.

2. The apparatus of claim 1 wherein the configuration information allocates all the stripes for storing user data in response to the generated allocation request specifying the selected RAID storage format as RAID 0.

3. The apparatus of claim 1 wherein the configuration information allocates half of the stripes for storing user data and half of the stripes for storing mirror data in response to the generated allocation request specifying the selected RAID storage format as RAID 1.

4. The apparatus of claim 1 wherein the configuration information allocates each user data stripe and the corresponding mirror data stripe in different physical storage devices.

5. The apparatus of claim 1 wherein the configuration information allocates a user data set comprising a plurality of user data stripes and a parity stripe calculated using the plurality of user data stripes in response to the generated allocation request specifying the selected RAID storage format as RAID 5.

6. The apparatus of claim 5 wherein the configuration information allocates each user data stripe and the corresponding parity stripe in different physical storage devices.

7. The apparatus of claim 1 wherein the configuration information allocates a first user data set and a second user data set comprising respective first and second plurality of user data stripes, the user data sets having one common stripe, a first parity stripe calculated using the first plurality of user data stripes, and a second parity stripe calculated using the second plurality of user data stripes in response to the generated allocation request specifying the selected RAID storage format as RAID 6.

8. The apparatus of claim 7 wherein the configuration information allocates each user data stripe and the corresponding parity stripe in different physical storage devices.

9. A method comprising:
prior to the generating an allocation request step, defining a fixed-size generic storage container having a preselected plurality of rows, each row of two or more storage stripes, each stripe in the same row from a different physical storage device, and wherein each of the physical storage devices has a total storage capacity that is greater than a sum of those portions of two or more generic storage containers residing in the respective physical storage device;
storing configuration information in a computer readable memory that allocates all the stripes in the storage container according to a selected RAID storage format specified by the generating an allocation request step;
after the allocating and defining steps, generating an allocation request that specifies the selected RAID storage format from a plurality of different RAID storage formats; and
in response to the generating an allocation request step, recalling the stored configuration information to allocate all the stripes in the storage container according to the selected RAID storage format.

10. The method of claim 9 wherein the generating an allocation request step is characterized by allocating all the stripes for storing user data in a RAID 0 storage format.

11. The method of claim 9 wherein the generating an allocation request step is characterized by allocating half of the stripes for storing user data and half of the stripes for storing mirror data in a RAID 1 storage format.

12. The method of claim 11 wherein the generating an allocation request step is characterized by allocating each user data stripe and the corresponding mirror data stripe in different physical storage devices.

13. The method of claim 9 wherein the generating an allocation request step is characterized by allocating a user data set comprising a plurality of user data stripes and a parity stripe calculated using the plurality of user data stripes in a RAID 5 storage format.

14. The method of claim 13 wherein the generating an allocation request step is characterized by allocating each user data stripe and the corresponding parity stripe in different physical storage devices.

15. The method of claim 9 wherein the generating an allocation request step is characterized by allocating a first user data set and a second user data set comprising respective first and second plurality of user data stripes, the user data sets having one common stripe, wherein a first parity stripe is calculated using the first plurality of user data stripes, and a second parity stripe is calculated using the second plurality of user data stripes, in a RAID 6 storage format.

16. The method of claim 15 wherein the generating an allocation request step is characterized by allocating each user data stripe and the corresponding parity stripe in different physical storage devices.

17. The method of claim 9 comprising providing a plurality of containers defining a sheet of storage capacity, and wherein the generating an allocation request step is characterized by allocating a user data stripe to a first container and a fault tolerance data stripe to a second container.

18. A data storage system comprising:
a fixed-size data storage grid having a storage capacity that is predetermined prior to a generated allocation request associated with a selected RAID storage format, the storage grid defined by a plurality of rows, each row of two or more data stripes, each stripe in the same row from a different physical storage device, and wherein each of the physical storage devices has a total storage capacity that is greater than a sum of those portions of two or more data storage grids residing in the respective physical storage device; and
means for configuring the data stripes in response to an allocation request specifying the selected RAID storage format of a plurality of different RAID storage formats.

19. The system of claim 18 wherein the means for configuring is characterized by maximizing the amount of the storage capacity allocated to user data while allocating all fault tolerance data associated with the user data within the same grid.

20. The system of claim 18 wherein the means for configuring is characterized by allocating user data to a first grid and allocating fault tolerance data to a different second grid.

21. An apparatus comprising:

a generic storage container of a fixed-size storage capacity, the storage capacity predetermined prior to a generated allocation request associated with one of a plurality of different redundant array of independent drives (RAID) storage formats, the generic storage container defined by a plurality of rows, each row of two or more storage stripes, each stripe in the same row from a different physical storage device, and wherein each of the physical storage devices has a total storage capacity that is greater than a sum of those portions of two or more generic storage containers residing in the respective physical storage device; and configuration information stored in a computer readable medium and executable to respond to an allocation request for a RAID 1 format by allocating substantially half of the stripes in the generic storage container for storing user data and the substantially other half of the stripes in the generic storage container for storing mirror data, and alternatively to respond to an allocation request for at least one of a RAID 5 and a RAID 6 format by allocating substantially more than half of the stripes in the generic storage container for storing user data and the substantially other less than half of the stripes in the generic storage container for storing parity data.

* * * * *